Dec. 9, 1958   K. C. STEELMAN   2,864,081
TELEMETERING SYSTEM
Filed Nov. 5, 1957   9 Sheets-Sheet 1

*INVENTOR.*
KENNETH C. STEELMAN
BY
*Harry M. Saragovitz*
ATTORNEY

FIG.2A

Dec. 9, 1958     K. C. STEELMAN     2,864,081
TELEMETERING SYSTEM Filed Nov. 5, 1957     9 Sheets-Sheet 6

FIG. 8

INVENTOR,
KENNETH C. STEELMAN
BY
Harry M. Saragovitz
ATTORNEY.

Dec. 9, 1958 K. C. STEELMAN 2,864,081
TELEMETERING SYSTEM
Filed Nov. 5, 1957 9 Sheets-Sheet 7

FIG. 9

INVENTOR,
KENNETH C. STEELMAN
BY
Harry M. Saragovitz
ATTORNEY.

United States Patent Office 2,864,081
Patented Dec. 9, 1958

2,864,081

TELEMETERING SYSTEM

Kenneth C. Steelman, Wanamassa, N. J., assignor to the United States of America as represented by the Secretary of the Army Application November 5, 1957, Serial No. 694,685

10 Claims. (Cl. 343—112)

(Granted under Title 35, U. S. Code (1952), sec. 266)

The invention described herein may be manufactured and used by or for the Government for governmental purposes, without the payment of any royalty thereon.

This invention relates to a telemetering system and more particularly to an instantaneous azimuth data transmission and receiving system for use with direction finding networks adapted for locating atmospheric electrical discharges.

It is well known that certain meteorological situations such as convective storms, are attended by lightning discharges or other severe atmospheric electrical disturbances commonly referred to by the term "sferics." It is common practice in locating such sources of electrical disturbances to employ techniques similar to that applied in radio direction finding. One direction finding device conventionally used for this purpose, static direction finder AN/GRD-1A, includes a cathode-ray tube oscilloscope which displays an immediate indication of the azimuth of the electrical disturbances in the form of a straight line trace whose orientation corresponds to the bearing of the disturbance with respect to the observation post. To attain a greater accuracy, at least three simultaneous observations are made at posts widely separated by distances of several hundred miles. Direction finding apparatus of this type are adapted to detect atmospheric discharges which occur within ranges extending to several thousand miles from the observation posts. One method of collecting the data from the observation posts was accomplished by the continual use of open-shutter 35 mm. cameras at each post. The bearing data was obtained manually from the film after it was developed and then transmitted to the central station for correlation and plotting. Since such a procedure required manual operation, it obviously was too time consuming. To overcome this defect, a telemetering system was developed which used mechanical scanning and recording devices. Such equipment also proved to be unsatisfactory for the purpose since the time resolution of the equipment was too long and could not distinguish between signals that were received closer together in time than 1/3 second. Since, statistically, it has been determined that for satisfactory operation under most conditions a system should be capable of transmitting sferic bearings at a rate of 100 per second, the defects of the prior systems are readily apparent.

It is therefore an object of the present invention to obviate the above mentioned difficulties by providing a meteorological telemetering system for automatically and simultaneously transmitting bearing indications from a plurality of observation posts to a central station and for concurrently receiving said bearings whereby the position of the electrical disturbances may be immediately and instantaneously plotted.

It is another object of the present invention to provide a meteorological telemetering system wherein bearing indications from a plurality of observation posts are rapidly resolved automatically at a central station by electronic means.

It is still another object of the present invention to provide a meteorological telemetering system having improved resolution time and which automatically provides instantaneous sferics data.

In accordance with the present invention there is provided an instantaneous telemetering system for use with a direction finder apparatus adapted to provide two in-phase damped sine-wave signals of a prescribed frequency and a trigger signal coincident with the initial half-cycle of the sine-wave signals when a signal having a given azimuth is detected by the apparatus. The telemetering system includes a storage tube having a mosaic target at one end thereof, a cathode-ray beam producing means at the other end thereof, and cathode-ray beam-deflecting means. Also included are means in circuit with the beam-deflecting means whereby the beam is cyclically scanned in a circular path on the mosaic target at a prescribed rate, zero circular scan time being coincident with a reference azimuth position. In addition there are included means in circuit with the beam-deflecting means and responsive to the relative amplitudes of the in-phase signal outputs from the direction finder apparatus whereby the cathode-ray beam is caused to trace a linear path from the center of the target when a signal is detected such that the angle formed by the linear trace and a line extending from the center of the mosaic target to zero circular scan time is a measure of the azimuth angle of the detected signal. Included further are means responsive to the trigger signal for simultaneously switching off the circular scan means and switching on the linear trace producing means upon the detection of the given azimuth signal whereby the circular scan is interrupted and the linear trace appears on the mosaic target only for a short duration relative to the circular scan cycle, and the circular scan is again applied after the short duration. Also included are means responsive to the trigger signal for deriving an output pulse from the mosaic target at the instant the circular scan intercepts the point where the linear trace had appeared and means for generating a prescribed number of time increment signals for each circular scan cycle. In addition there are included gating means in circuit with the time increment signals and responsive to the circular scanning means and the mosaic target output pulse whereby the gating means is rendered conductive at the beginning of each circular scan to pass the time increment signals and rendered non-conductive upon the application of the mosaic target output pulse, the total number of time increment signals passed during the conductive period being of a time duration proportional to the azimuth angle of the detected signal. Also included are means responsive to the time increment signal output of the gating means for converting said time duration to a binary pulse code having its digits spaced such that the code corresponding to the prescribed number of time increment signal is completed within one scan cycle, and means for transmitting a signal modulated by the binary code. Further included are a remote receiver for demodulating the transmitted signal to reproduce the binary pulse code and means at the receiver responsive to the reproduced binary pulse code for converting the binary code to the time duration proportional to the azimuth angle of the detected signal.

For a better understanding of the invention together with further objects thereof, reference is had to the following description taken in connection with the accompanying drawings in which.

Figure 1:
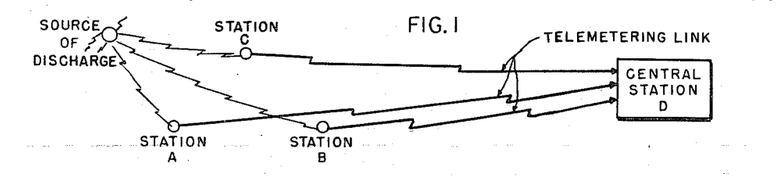
Figure 1 illustrates the application of a telemetering link in a sferics locating system.

Referring now to Fig. 1 of the drawings, there is shown a sferics network including three observation stations A, B, and C and a central or control station D. Each observation station is provided with identical instantaneous direction finders and a transmitter unit of the telemetering system, while the receiver unit of the telemetering system is located at the control station. The receiver unit includes a decoder which converts the transmitted code signal to its original form so that it may be utilized in an electronic plotter. Inasmuch as the telemetering transmitter units at the observation stations are identical both in construction and operation, only one such unit is described in detail hereinbelow.

Figure 2:
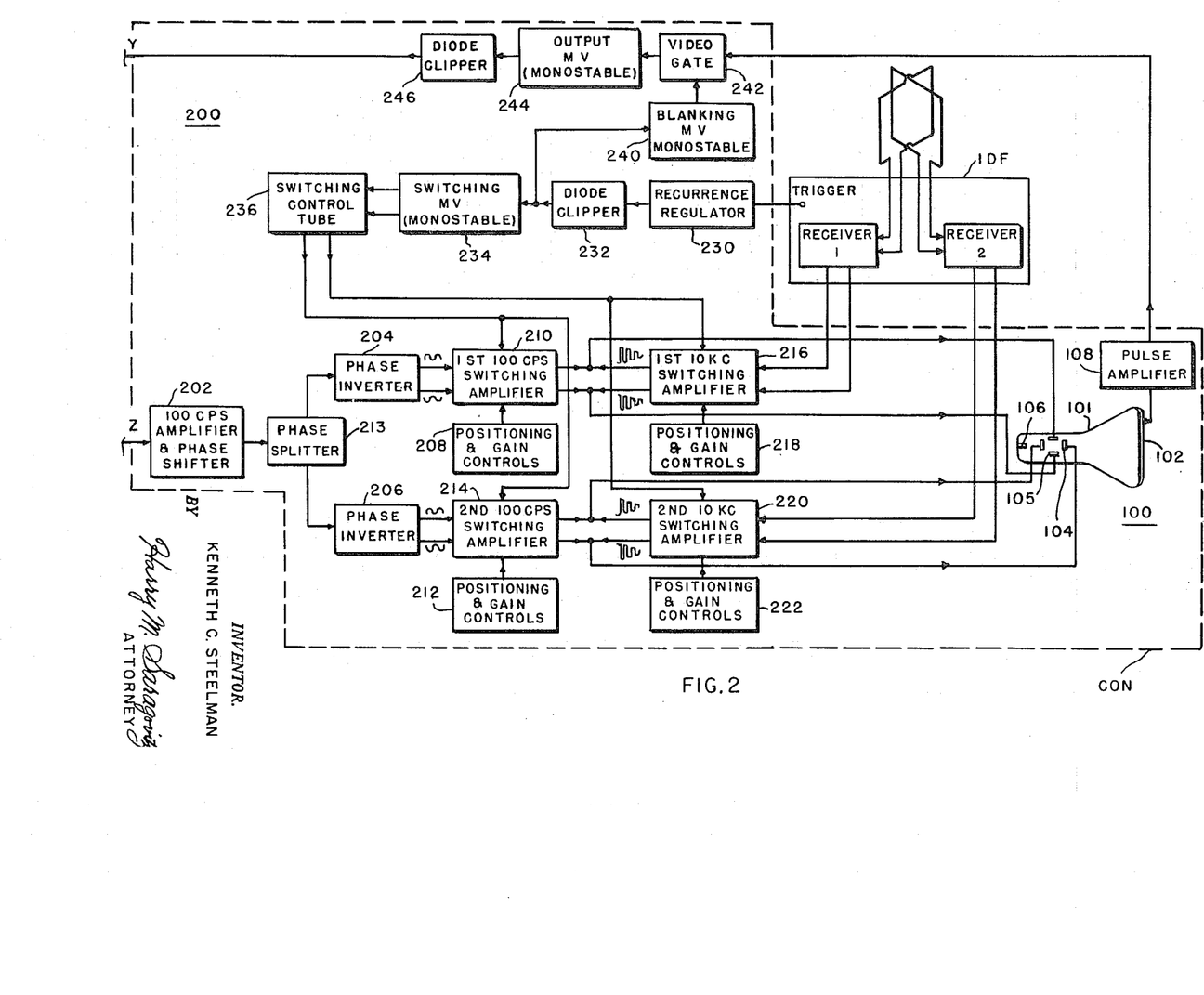
Figures 2 and 2A illustrate in block form the components of the telemetric transmitter system and its associated direction finder.
Figure 2A:
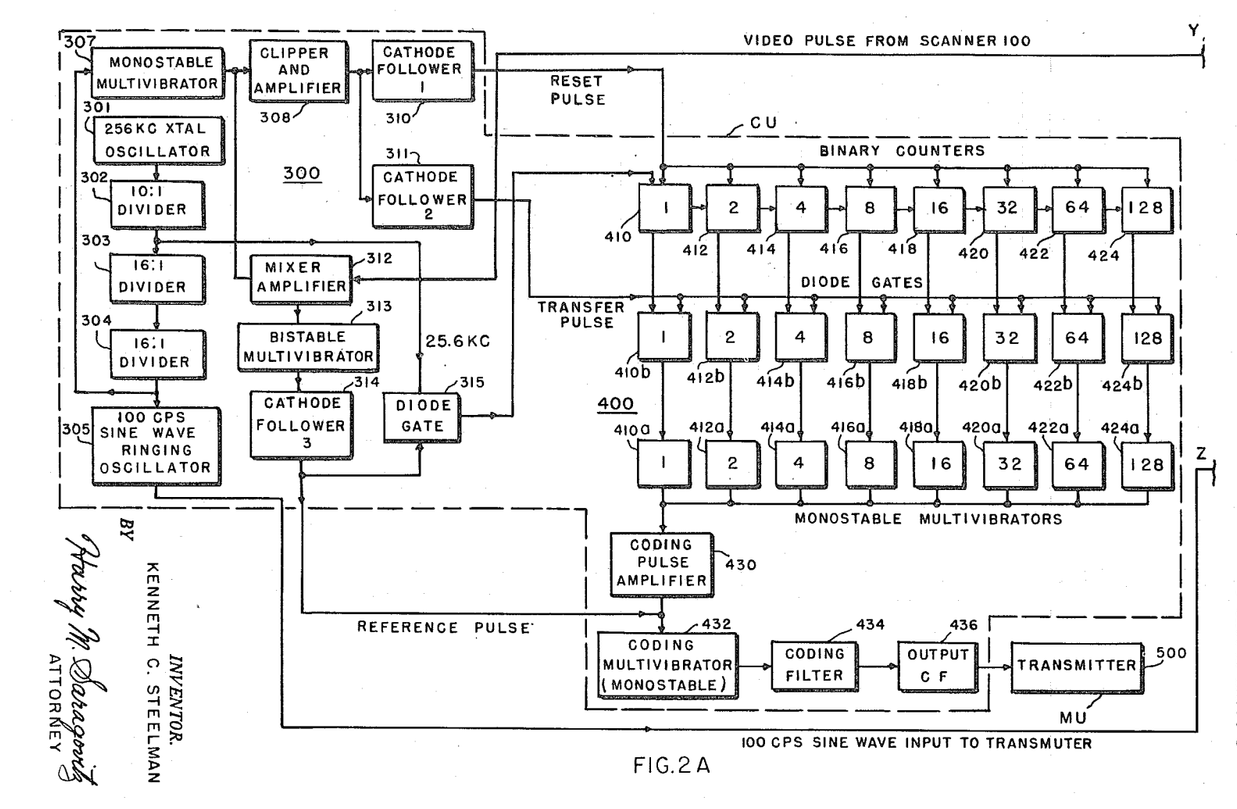

Figs. 2 and 2A show the components which comprise the transmitter unit and its associated direction finder. The instantaneous direction finder IDF comprises a crossed-loop antenna having respective outputs applied to separate radio frequency receivers designated respectively as receivers 1 and 2. The azimuth determining function of such direction finders are so well known in the art that no detailed description thereof is believed necessary. One such direction finder provides a 10 kc. damped sine-wave from each receiver when a signal is detected and, simultaneously, provides an output trigger pulse coincident with the leading edge of the first cycle of the 10 kc. damped sine-wave. The transmitter includes a converter unit CON, a coding unit CU, and a modulator transmitter unit MU. Converter unit CON comprises a scanner 100 and a data transmuter 200, and coding unit CU includes a timing generator 300 and a code generator 400. Scanner 100 provides video pulse signals and comprises a cathode-ray type storage tube and a pulse amplifier. Data transmuter 200 converts the azimuth data derived from direction finder IDF to time data and includes switching control circuits, sweep amplifiers, phase shifting circuits, blanking circuits and video pulse correction circuits. Timing generator 300 includes a crystal controlled oscillator, frequency dividers, a synchronized 100 C. P. S. sine-wave oscillator, a pulse counting gate and associated synchronizing circuits. Code generator 400 includes a series of binary scalers and associated gates and monostable multivibrators, a coding output multivibrator and a low-pass filter. Modulator unit MU is of conventional design and is adapted to amplitude modulate the transmitter in accordance with the output of code generator 400. The details of the telemetering component at each of the observation stations will now be described.

*Timing generator (300)*

Figure 3:
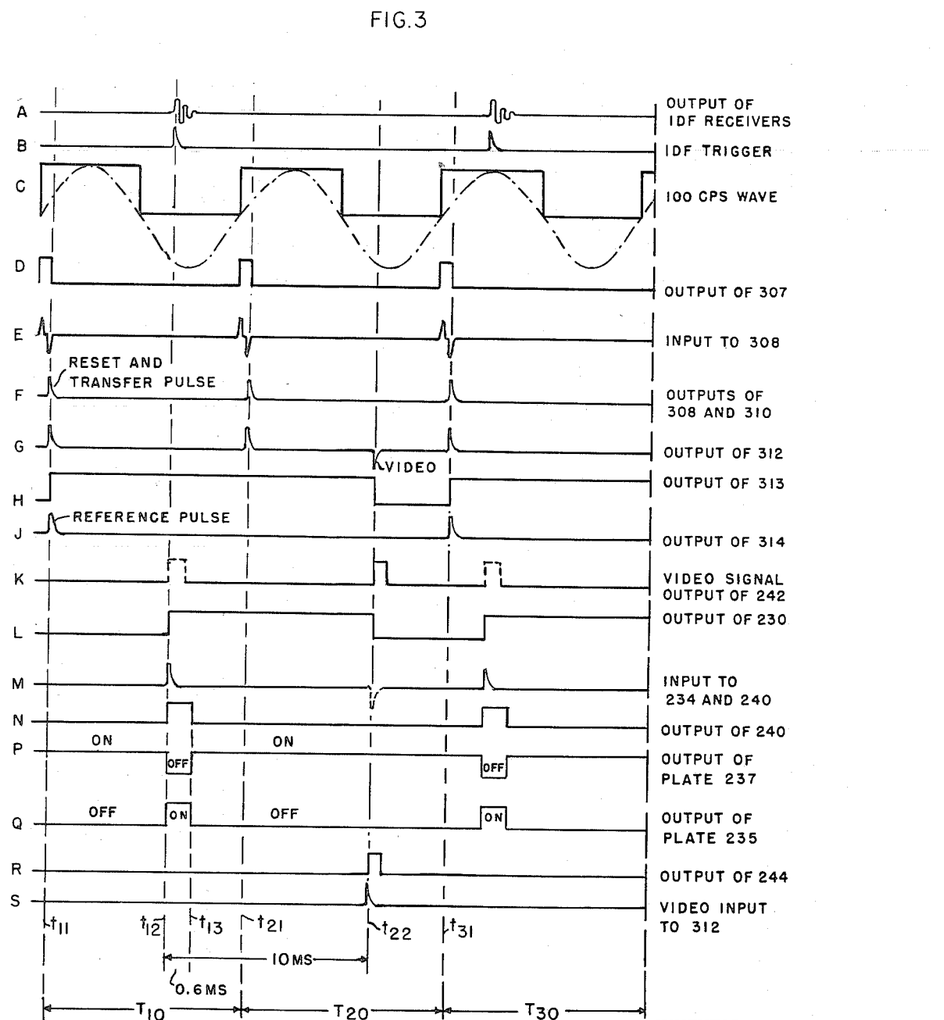
Figure 3 is a group of explanatory curves illustrating the time sequence of pulses derived from the timing generator, transmuter, and direction finder.
Figure 4:
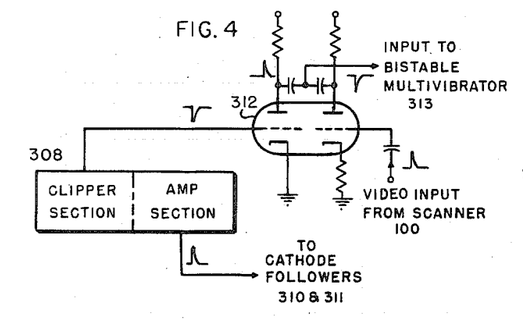
Figure 4 is a schematic representation of the amplifier-mixer utilized in the timing generator.

The timing generator will be described in connection with Figs. 2A, 3C-3J, and 4. Referring now to Fig. 2A, timing generator 300 includes a crystal controlled oscillator 301 adapted to generate a frequency of 256 kc. which is applied to conventional divider and pulse shaping circuits to provide pulses having respective frequencies of 25.6 kc. and 100 C. P. S. As shown, the 256 kc. output from oscillator 301 is applied to a 10:1 divider circuit 302 to produce pulses of 25.6 kc., and two additional 16:1 divider circuits 303 and 304 are provided to produce a square wave frequency of 100 C. P. S. shown by the solid line in curve 3C. The 100 C. P. S. output from divider 304 is applied as a synchronizing pulse to ring a sine-wave oscillator 305 which is adapted to generate a sine-wave frequency of 100 C. P. S. as shown in the dashed portion of curve 3C. The 100 C. P. S. output from 16:1 divider 304 is also applied to a monostable multivibrator 307 adapted to produce a series of relatively narrow pulses 15 microseconds wide which occur at a rate of 100 C. P. S. These pulses are shown in curve 3D. The output from monostable multivibrator 307 is differentiated as shown in curve 3E and applied to a clipper and amplifier circuit 308 which clips the positive portion of the differentiated pulse and inverts the negative portion thereof to produce positive going peaked pulses coincident with the trailing edge of the pulses derived from monostable multivibrator 307 as shown in curve 3F. The output from clipper-amplifier 308 is applied simultaneously to the inputs of two isolation cathode followers 310 and 311, one of which provides what is hereinafter referred to as the reset pulse, and the other provides what is hereinafter referred to as the transfer pulse. The negative output from the clipper section of circuit 308 is also applied to a mixer-amplifier 312 having two discrete output circuits, but with the output circuits connected to a common load as will hereinafter be explained in connection with Fig. 4. As shown in Fig. 4, mixer-amplifier 312 includes two discrete input grids, and associated plates and cathodes. One input grid is responsive to the negative output pulse from the clipper section of circuit 308 so that there is produced at its associated plate a positive peaked pulse occurring cyclically at 100 C. P. S. and having its leading edge coincident with the trailing edge of the output pulses derived from monostable multivibrator 307. Applied to the other input grid of mixer-amplifier 312 is a positive video pulse derived from scanner 100 as hereinbelow described. When this video pulse is applied as an input to mixer-amplifier 312, the associated output plate circuit develops a negative pulse, and as will be explained below, the positive and negative pulses derived from the respective output circuits of mixer-amplifier 312 occur at different times as shown in curve 3G. Both outputs from mixer-amplifier 312 are coupled through respective capacitors to a common connection which forms the input to bistable multivibrator 313 which, when triggered by the positive pulse output derived from mixer-amplifier 312, will provide a relative positive voltage level until such time as the video pulse from scanner 100 is applied to mixer-amplifier 312. At this instant, the negative output pulse from mixer-amplifier 312 will flop bistable multivibrator 313 to provide a relative negative voltage level therefrom until such time that the positive trigger pulse from mixer-amplifier 312 is again applied as a trigger to bistable multivibrator 313. The output of bistable multivibrator 313, illustrated in curve 3H, is applied through cathode follower 314 to a diode gate 315 to which is also applied the 25.6 kc. pulses from divider circuit 302. Diode gate 315 is normally biased so that it presents a closed or conductive circuit to the 25.6 kc. pulses from divider circuit 302 for the duration of the positive voltage level output from bistable multivibrator 313, so as to permit the 25.6 kc. pulses to pass to code generator 400. However, at the instant the video pulse from scanner 100 is applied to mixer-amplifier 312, diode gate 315 is rendered non-conductive by the negative voltage level output of bistable multivibrator 313 until the cyclic positive 100 C. P. S. pulse is again applied to bistable multivibrator 313 from one of the outputs of mixer-amplifier tube 312. Thus, for the duration of the negative voltage level no 25.6 kc. pulses can be applied to code generator 400 until the start of the next cycle. The output of cathode follower 314 is also differentiated and clipped and applied to code generator 400 as a positive peak pulse coincident with the leading edge of the positive pulse derived from bistable multivibrator 313 as shown in curve 3J. This pulse will hereinafter be referred to as the reference pulse. It is to be noted that both the reset pulse and the transfer pulse occur cyclically at a frequency of 100 C. P. S. and are coincident with the trailing edge of the output pulses from monostable multivibrator 307 so that there is a 15 microsecond delay between these pulses and the leading edge of the positive square wave 100 C. P. S. pulse output from divider 304. It is to be noted also that the leading edge of the positive gating voltage from bistable multivibrator 313 is coincident with both the reset and transfer pulses so that there is also a 15 microsecond delay between the leading edge of the positive square wave 100 C. P. S. pulse from divider 304 and the leading edge of the positive gating voltage output from bistable multivibrator 313.

*Data transmuter and scanner*

Referring now to Fig. 2, scanner 100 comprises a cathode-ray type storage tube 101 provided with a mosaic target 102, conventional horizontal and vertical electrostatic deflection plates 104 and 105, respectively, and a conventional electron gun 106. One type tube especially adapted for this purpose is the iconoscope. For the sake of clarity, the grid focusing elements and the operational potentials required have been omitted from the drawing. The output of mosaic target 102, referred to as the video pulse signal, is applied to the input of a pulse video amplifier 108 which is responsive to the video pulse signal output derived from mosaic target 102 only when there is a change in the charge thereon as explained below.

Figure 5:
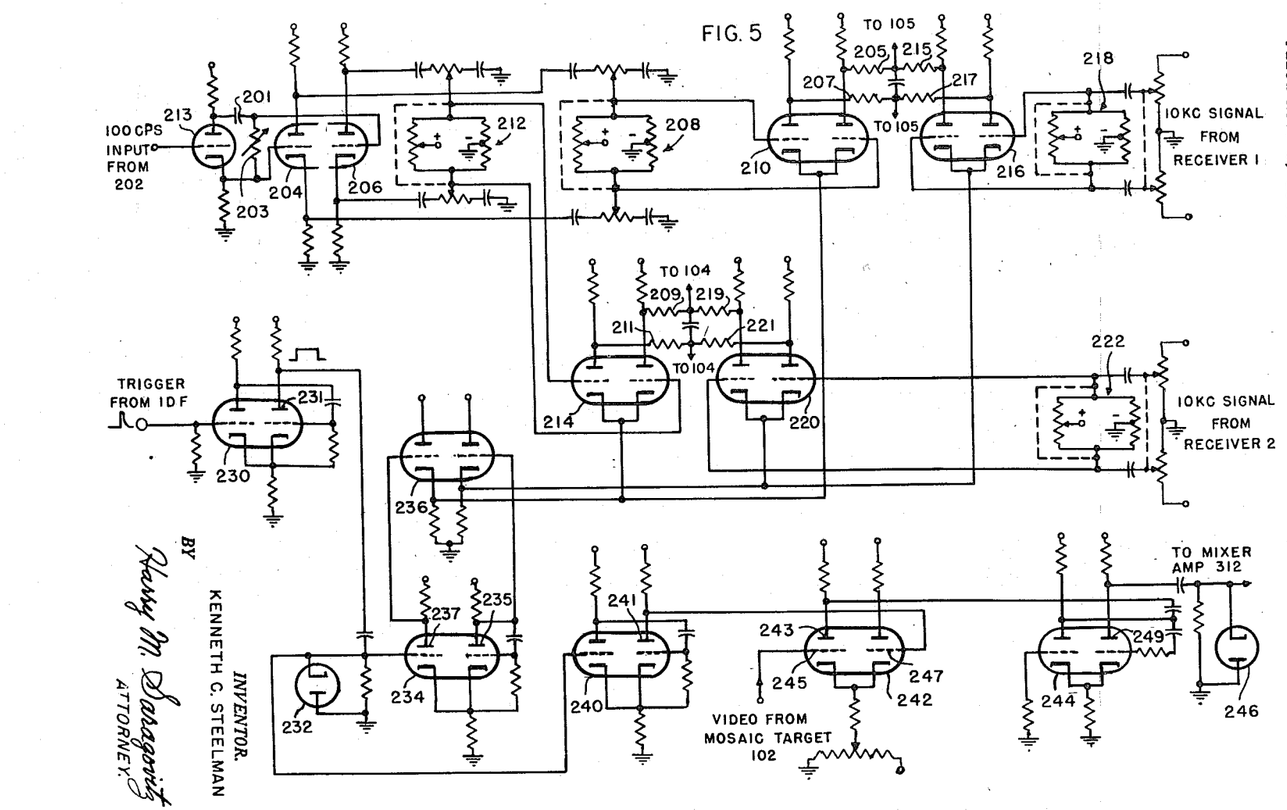
Figure 5 is a schematic representation of the transmuter.

Reference is now made to the block and schematic diagrams, Figs. 2 and 5 of the data transmuter and the curves A and B, and J through S of Fig. 3. In Figs. 2 and 5 like reference numerals identify like elements. The transmuter provides the sweep voltages applied to both the horizontal and vertical deflection plates 104 and 105 and also provides circuitry for controlling the time of application of the video pulse signal to mixer-amplifier 312 in timing generator 300. As shown in Fig. 2, the 100 C. P. S. sine-wave from oscillator 305 in the timing generator is applied to phase-splitter 213 through phase-shifter 202, which is of conventional design and corrects for any phase shift that may occur in the output of the 100 C. P. S. sine-wave oscillator when applied to the transmuter. Phase-splitter 213 is a triode having a capacitor 201 (Fig. 5) and a variable resistor 203 connected as a phase shifting network between the cathode and plate. The output developed across variable resistor 203 provides two discrete 100 C. P. S. sine-wave oscillations differing in phase by 90°, and which are applied to respective grids of phase-inverter circuits 204 and 206. The respective outputs from the plates and cathodes of phase-inverters 204 and 206 provide push-pull output signals which differ 180° in phase. Thus, for one output component from phase-splitter 213, two 100 C. P. S. since-wave signals are derived from phase-inverter 204 which differ 180° in phase, and, for the other output component from phase-splitter 213, two 100 C. P. S. sine-wave signals are derived from phase-inverter 206 which also differ 180° in phase. The push-pull output from phase inverter 204 is applied through positioning and gain control circuit 208 to a first 100 C. P. S. switching amplifier 210, the push-pull output of which is applied through plate resistors 205 and 207 across the vertical deflection plates 105 of storage tube 101. Similarly, the push-pull output from phase-inverter 206 is applied through positioning and gain control circuit 212 to a second 100 C. P. S. switching amplifier 214, the push-pull output of which is applied through plate resistors 209 and 211 across the horizontal deflection plates 104 of storage tube 101. The vertical deflection plates 105 of storage tube 101 are also connected through resistors 215 and 217 to the push-pull output of a first 10 kc. switching amplifier 216 to which is applied in push-pull arrangement through positioning and gain control circuit 218 the 10 kc. signal from receiver #1 of direction finder IDF. In a like manner, horizontal deflection plates 104 are connected through resistors 219 and 221 to the push-pull output of a second 10 kc. switching amplifier 220 to which is applied in push-pull arrangement through positioning and gain control circuit 222 the 10 kc. signal from receiver #2 of direction finder IDF. Since the push-pull signals applied to the respective deflection plates 104 and 105 from respective 10 kc. switching amplifiers 220 and 216 are in phase but differ in amplitude, the indication on the mosaic of target 102 due to the presence of the received IDF signals will be a straight line representing the azimuth of the sferics signal detected at the IDF receiver with respect to a referenced zero or north azimuth position. The length of the line trace and its correct zero or north azimuth position are initially adjusted by means of positioning and gain control circuits 218 and 222. When the push-pull signals from respective 100 C. P. S. switching amplifiers 210 and 214 are applied to deflection plates 105 and 104, a circular trace will be scanned on mosaic target 102 inasmuch as the 100 C. P. S. applied signals are 90° out-of-phase. The diameter of the circular trace and its correct zero or north azimuth starting point are initially adjusted by means of respective positioning and gain control circuits 208 and 212. Thus, when both 100 C. P. S. switching amplifiers are "on," the trace on mosaic target 102 will be a circular scan occurring at a rate of 100 cycles per second, and when both 10 kc. switching amplifiers are "on," the trace will be a straight line.

The switching amplifiers are operated so that when one set of switching amplifiers are "on," the other set of switching amplifiers are "off." The circuit for controlling the operation of the 100 C. P. S. and 10 kc. switching amplifiers includes a recurrence regulator tube 230, a diode clipper 232, a switching monostable multivibrator 234 and a switch control tube 236. Recurrence regulator tube 230 is a monostable multivibrator circuit adapted to normally produce a relative negative voltage level from its output plate 231. Triggering pulses (curve 3B) from the IDF which coincide with the leading edge of the 10 kc. sine-wave signal outputs (curve 3A) from the IDF receiver are applied to the input of recurrence regulator tube 230 and, as a result, there is produced at the output thereof a relative positive level pulse of 10 millisecond duration, shown in curve 3L, for each trigger pulse applied. Thus, recurrence regulator 230 can be triggered cyclically only at a rate of 100 cycles a second, or one trigger for each circular scan applied to mosaic target 102 from the outputs of the 100 C. P. S. switching amplifiers. The 10 millisecond positive output pulse from recurrence regulator tube 230 is differentiated and applied to diode clipper 232 to produce the positive peaked trigger pulse shown in curve 3M and which is applied to switching monostable multivibrator 234. The negative differentiated pulse, shown in dotted lines, is rendered ineffective by the action of diode clipper 232 whose cathode is connected to the input grid of switching monostable multivibrator 234. When switching monostable multivibrator 234 is in its quiescent condition, the output from plate 235 of the multivibrator is relatively negative and the output of the plate 237 is relatively positive. However, when triggered by the differentiated peaked positive pulse derived from diode clipper 232 the outputs from the plates of multivibrator 234 are reversed so that positive and negative pulses are simultaneously derived from plates 235 and 237, respectively. The output from plate 235 is shown in curve 3Q and the output from plate 237 is shown in curve 3P. The outputs from the respective plates of switching monostable multivibrator 234 are simultaneously applied to switch control tube 236 which comprises two cathode followers. The output from plate 235 is applied to the input grid of one cathode follower while the output from plate 237 is applied to the input grid of the other cathode follower. As shown in Fig. 5 one cathode follower output is connected in common to the cathodes of the 100 C. P. S. switching amplifiers 210 and 214 while the other cathode follower output is connected in common to the cathodes of the 10 kc. switching amplifiers 216 and 220. Thus, without any input trigger signal from direction finder IDF, the outputs derived from the plates of switching monostable multivibrator 234 and applied to switch control tube 236 are such that only the 100 C. P. S. switching amplifiers 210 and 214 are conducting and the 10 kc. switching amplifiers 216 and 220 are cut-off. So long as the 100 C. P. S. switching amplifiers are conducting, a circular trace scanned at 100 C. P. S. is generated on mosaic target 102. However, when a trigger signal is applied from direction finder IDF, the output pulses derived from switching monostable multivibrator 234 and applied to switch control tube 236 will be such as to cause the 100 C. P. S. switching amplifiers 210 and 214 to be non-conductive and simultaneously render the 10 kc. switching amplifiers 216 and 220 conductive. As a result, the circular scan will be turned off and the scan appearing on mosaic target 102 will be a straight line representing the azimuth of the sferics signal as hereinabove described. The parameters of multivibrator 234 are chosen such that the pulsed outputs therefrom due to the application of the trigger pulse are about 0.5 millisecond in duration. Thus the circular scan is off for approximately 0.5 millisecond and is then applied again to mosaic target 102 through the 100 C. P. S. switching amplifiers 210 and 214 to complete the circular scan cycle. The picture on mosaic target 102 for this action is shown in Fig. 6.

Figure 6:
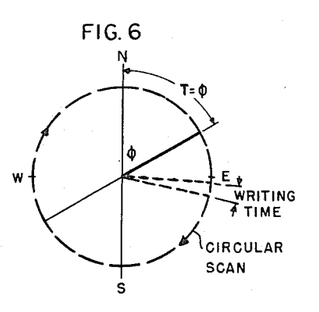
Figure 6 is a diagrammatic representation of the scanner.

Referring now to Fig. 6, the 0° line represents zero time, that is, the start of each scan cycle, and zero or north bearing reference. The circular trace appears on mosaic target 102 until the sferics signal is applied thereto from direction finder IDF through the 10 kc. switching amplifiers 216 and 220 and at this instant the trace on mosaic target 102 is a straight line making an angle φ with the zero bearing reference line. The angle φ of course is the azimuth bearing of the sferics signal. As explained hereinabove, the 10 kc. switching amplifiers are on for only 0.5 millisecond after which the circular scan again automatically appears. This 0.5 millisecond duration is known as the "writing period" and when the circular scan intersects what had previously been the azimuth bearing indication, a pulse is derived from mosaic target 102 and applied to pulse amplifier 108. As shown in Fig. 6, the "writing period" and the bearing indication do not of necessity coincide since the circular scan trace is completely independent of the bearing indication.

The circuit for controlling the time of application of the video signal output from mosaic target 102 to mixer-amplifier 312 in the timing generator is also included in the transmuter unit. This circuit comprises blanking monostable multivibrator 240, a video gate circuit 242, an output monostable multivibrator 244 and a diode clipper 246. Referring now again to Figs. 2 and 5, the differentiated positive trigger pulse applied through diode clipper 232 to switching monostable multivibrator 234 is also simultaneously applied to blanking monostable multivibrator 240, the output of which is applied from plate 241 as a blanking pulse to one input grid 247 of video gate tube 242. Another input grid 245 of video gate tube 242 is connected to the output of pulse amplifier 108. The video gate tube is so arranged that there is no video output from plate 243 when blanking monostable multivibrator 240 is triggered to generate a positive pulse at its output plate 241. In its quiescent state the left side of the multivibrator 240 is normally cut off with the right side normally conducting so that a negative voltage pulse from plate 241 is applied to grid 247 of video gate tube 242. As shown, the cathodes of video gate tube 242 are connected to a common cathode resistor so that with multivibrator 240 in its quiescent state, the left side of video gate tube 242 will be conducting since the bias developed across the common cathode resistor of video gate tube 242 is not enough to cut it off. However, with the positive trigger signal from diode 232 applied to the left grid of blanking multivibrator 240, a positive pulse of approximately 0.6 millisecond duration (curve 3N) will be applied to grid 247 of video gate tube 242 so that during this time the left side of video gate tube 242 is cut off by the voltage developed across the common cathode resistor and no video signals can be derived from output plate 243 of video gate 242. After 0.6 millisecond, blanking multivibrator 240 returns to its quiescent state and video signals applied to grid 245 from pulse amplifier 108 will again be derived at plate 243. By such an arrangement, any video output pulse from video gate tube 242 during the "writing" time, i. e., the time when the 10 kc. switching amplifiers are "on" and the 100 C. P. S. switching amplifiers are "off," is blanked out. At any other time, video gate tube 242 will be open to pass video signals from pulse amplifier 108. Thus, at the instant in time that a sferics bearing line appears on the mosaic target and for the duration of the "writing" time, no video pulse signal passes through video gate tube 242. The continuing circular scan will then pass what was the point of intersection of the sferics bearing line and the previous circular scan on mosaic target 102 and the difference in charge on the mosaic target will provide a video pulse signal at grid 245 so that at this instant a video signal is developed at output plate 243 of the video gate tube 242. The video output signal is shown in curve 3K. The dashed pulses represent the video signals which are blanked out by multivibrator 240 and do not pass through video gate tube 242. The signal from the video gate output plate 243 is applied as a triggering pulse to output monostable multivibrator 244 where the video pulse is reshaped to provide a step leading edge, and the output from plate 249 of multivibrator 244 (curve 3R) is differentiated and applied to a clipper diode 246 which clips the negative differentiated pulse so that only the positive differentiated peaked pulse (curve 3S) passes on as the video signal input to mixer-amplifier 312 in timing generator 300.

At this point it would be advisable to show the time relationship between the outputs derived from data transmuter 200 and timing generator 300 and the pulse video output of mosaic target 102 in scanner 100. Referring now to Fig. 3, the cyclic durations $T_{10}$, $T_{20}$, $T_{30}$ represent three complete circular scanning cycles. The reset and transfer pulses are shown in curve 3F at times $t_{11}$, $t_{21}$, $t_{31}$. These pulses are coincident in time and cyclically recur at 100 C. P. S. but are displaced in time 15 microseconds from the start of each of the 100 C. P. S. sine-waves applied from ringing oscillator 305 so that a sferics signal arriving at zero degrees azimuth can be readily distinguished from the reference pulses, as will hereinafter be explained. The peaked positive pulses shown in curve 3G are derived from one of the outputs of mixer-amplifier 312 and also recur cyclically at 100 C. P. S. at times $t_{11}$, $t_{21}$, and $t_{31}$. Assuming now that the sferics and IDF trigger signals shown in curves 3A and 3B, respectively, are applied from direction finder IDF at time $t_{12}$, then at this instant the 10 kc. switching amplifiers 216 and 218 are placed "on" and the 100 C. P. S. switching amplifiers 210 and 214 are switched "off" for 0.5 millisecond duration. The pulses producing this gating action are shown in curves 3Q and 3P, respectively. It is to be understood of course that the circular scan is independent of the linear bearing trace applied to the mosaic target 102 so that the "writing" time does not necessarily coincide with the time the bearing trace is applied to mosaic target 102, although such a coincidence may occur. Simultaneously at time $t_{12}$ a positive pulse of 10 millisecond duration, shown in curve 3L, is derived at the output of recurrence regulator 230 so that for any one complete circular scan only one sferics received signal can be presented on mosaic target 102. Also, at time $t_{12}$ the 0.6 millisecond blanking pulse shown in curve 3N is derived from blanking multivibrator 240 to block video gate tube 242 so that for the 0.6 millisecond duration $t_{12}$—$t_{13}$, no video signal can pass through to mixer-amplifier 312. Due to the 10 millisecond output pulse from recurrence regulator 320, the time $t_{22}$ in second scanning cycle $T_{20}$ corresponds to the point of intersection of the intersection of the angular representation of the sferics signal on mosaic target 102 and the previous circular scanning cycle $T_{10}$. As shown in curve 3H, from time $t_{11}$ to time $t_{22}$ the output of bistable multivibrator 313 is a positive pulse which allows timing generator diode gate 315 to conduct. At the instant $t_{22}$, the negative pulse output from mixer-amplifier 312 corresponding to the video input from video gate tube 242 flops the output of bistable multivibrator 313 so that diode gate 315 at this instant becomes non-conductive and will remain so until the next positive output pulse is applied at time $t_{31}$ from mixer-amplifier 312. Thus diode gets 315 remains open only until such time as $t_{22}$ when a video pulse signal is allowed to pass to mixer-amplifier 312 and will remain closed for the duration corresponding to the time $t_{22}$—$t_{31}$. Video gate tube 242 will be opened or rendered conductive for the duration of the second circular scan $T_{20}$ so that a video signal is passed to mixer-amplifier 312 at time $t_{22}$ to produce a negative output pulse from mixer-amplifier 312 as shown in curve 3G. At time $t_{31}$, a reference pulse, curve 3J, also appears at the output of cathode follower 314 which is coincident with the reset pulse developed at time $t_{31}$ so that the reset pulse, the transfer pulse and the reference pulse derived at time $t_{31}$ are in time coincidence. Also at time $t_{31}$, the output from bistable multivibrator 313 is again flopped so that it is now positive to reopen diode gate 315 and the cycle $T_{10}$ is repeated for the duration $T_{30}$. Thus it can be seen that when a target is received during any one circular scan by direction finder IDF, no video pulse is applied to mixer-amplifier 312 during the first circular scan but is allowed to pass during the following successive circular scan. The time $t_{21}$—$t_{22}$ is proportional to the bearing angle and, as will be explained below, includes the appropriate number of 25.6 kc. time increment pulses which corresponds to the measurement of the bearing angle.

*Code generator (400)*

It is the function of the code generator 400 to convert the angular or bearing data presented on mosaic target 102 to digital form. As hereinabove explained, the electron beam applied to mosaic target 102 is normally scanning in a circular pattern at 100 C. P. S. and when diode gate 315 in the timing generator is open, 25.6 kc. pulses from 10:1 divider circuit 302 are applied as inputs to code generator 400. For the 10 millisecond duration of each scanning cycle, 256 pulses are generated in the output of divider circuit 302 so that, in effect, the 360° of azimuth is divided into 256 parts or time increments. Each of the 256 increments represents approximately 1.41 degrees and since the inherent accuracy of the direction finder IDF is no better than ±2 degrees, such subdivision is sufficient for the purpose. To distinguish these units from the normal degree system of measuring azimuth, the 256 increments are hereinafter referred to as "thetas" and symbolically designated by $\theta$.

Referring now to Fig. 2A of the drawing, blocks 410–424 represent a binary chain constituting eight cascaded binary scalers to form a scale-of-128 counter. Such binary chains are well known in the art and may comprise eight cascaded GE type 4N1A3 binary scalers adapted to provide a total count of 255 "thetas" which combines with a "theta" corresponding to zero azimuth, and also zero time insofar as the start of each cycle is concerned, to produce a total count of 256 "thetas" for each 360° of azimuth. The reset pulse from cathode follower 310 in timing generator 300 is applied as an input trigger to each of the binary scalers 410–424 so that at the start of each circular scan all the binary scalers are in their zero or "off" position. Diode gate 315 in timing generator 300 is also rendered conductive by the reset pulse to pass the 25.6 kc. pulses from 10:1 divider 302 to the first binary scaler 410 of the binary chain which will begin to count until the time a video pulse from mosaic target 102 is applied to mixer-amplifier 312 in timing generator 300. With no video pulse applied to mixer-amplifier 312, all the binary scalers will "continue through" for one complete circular scan and resume the count again for the next circular scan after being reset by the reset pulse. At the instant a video pulse is passed to mixer-amplifier 312, such as at time $t_{22}$ in Fig. 3, diode gate 315 is rendered non-conductive so that no further 25.6 kc. pulses or "thetas" are applied to 1-binary scaler 410, and, as a result the binary scalers will maintain their respective "on" and "off" positions until the next successive reset pulse is applied thereto. As shown in Fig. 3 this occurs at $t_{31}$ at which instant there is also derived a transfer pulse from cathode follower 311 in timing generator 300. In the example illustrated in Fig. 8, the sferics signal detected during scan $T_{10}$ is applied as the video pulse during scan $T_{20}$ to mixer-amplifier 312 after twenty-two "thetas," i. e. twenty-three 25.6 kc. pulses, have passed through to 1-binary scaler 410 so that at time $t_{22}$ the 1-binary scaler 410 is "off"; the 2-, 4- and 16-binary scalers 412, 414 and 418 are "on"; and the remaining binary scalers are "off." At the start of the next successive scan cycle, time $t_{31}$, the binary scalers which are "on" are triggered to "off" by the reset pulse and simultaneously provide positive output pulses, while no output pulse are derived from those binary scalers which are "off." The respective outputs of each of the binary scalers 410–424 are differentiated and applied to discrete monostable multivibrators represented by blocks 410a–424a through respective diode gate circuits represented by blocks 410b–424b. To each of the diode gates 410b–424b there is simultaneously applied the transfer pulse derived from cathode follower 311 which permits the respective diode gates 410b–424b to pass the differentiated positive output pulses derived from the binary scalers which are "on" as a trigger pulse to associated monostable multivibrators. The parameters of the monostable multivibrators are selected such that there are derived output pulses having widths which successively increase in millisecond steps from monostable multivibrator 410a to monostable multivibrator 424a. These output pulses only occur, of course, when a trigger pulse is passed through a respective diode gate to its associated monostable multivibrator. Thus, the pulse width output from monostable multivibrator 410a is set for one millisecond duration and the pulse width outputs from monostable multivibrators 412a–424a are set to provide pulse widths from 2 milliseconds to 8 milliseconds in duration, respectively. As will be explained below, the output pulses from monostable multivibrators 410a–424a are combined with another output pulse of substantially one millisecond duration derived from the reference pulse to account for the 10 millisecond circular scan time. The trailing edges of the output pulses from respective monostable multivibrators 410a–424a are applied as negative peaked pulses to a coding pulse amplifier 430, the positive output of which triggers a coding monostable multivibrator 432. The reference pulse from timing generator cathode follower 314 is also applied as a trigger to coding monostable multivibrator 432 which is so arranged that each time it is triggered there is produced an output pulse substantially one millisecond in duration to form a serial binary code. The serial binary code is then passed through a coding filter 434 of conventional design to remove the high frequency components of the code pulses. The output of coding filter 434 is then applied through output cathode follower 436 as a modulating signal to transmitter 500 which transmits the coded signal to the central station D.

Figure 7:
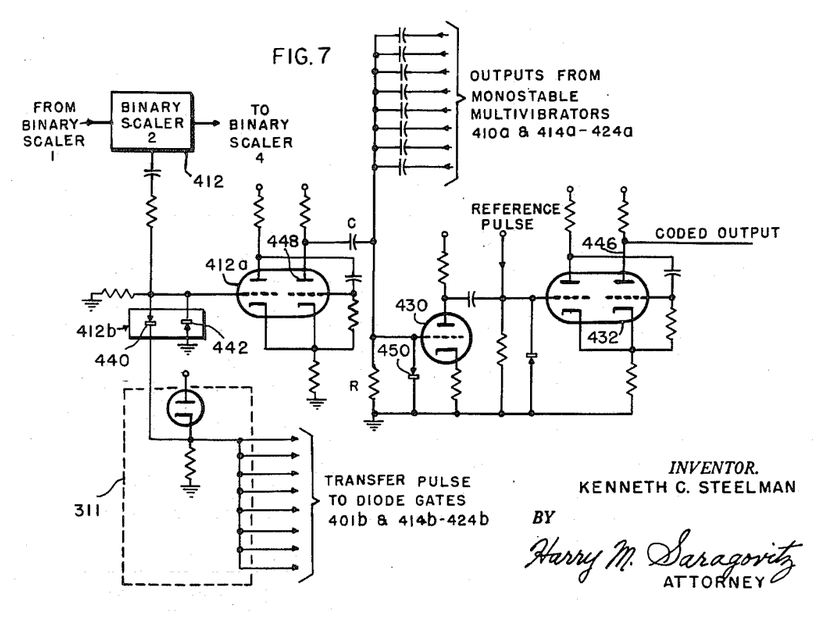
Figure 7 is a schematic illustration of one representative component of the binary pulse coding unit.
Figure 8:
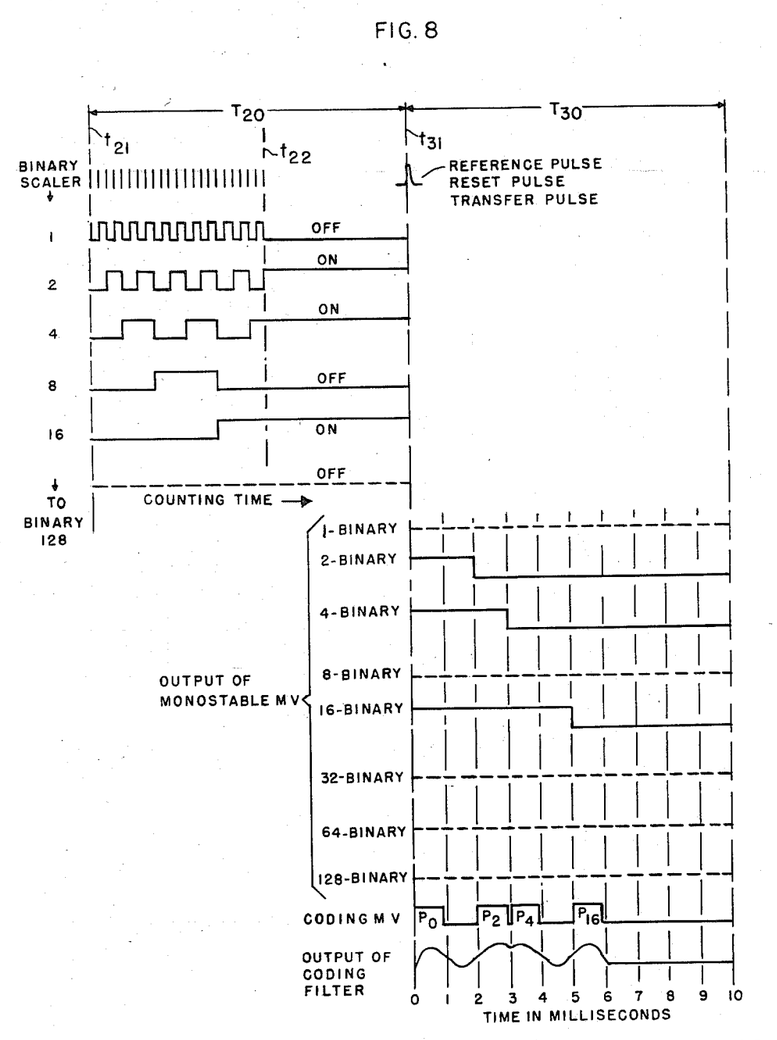
Figure 8 illustrates a group of curves for explaining the operation of the coding unit.

In order to illustrate how the serial binary code is derived, reference is made to the curves of Figs. 3 and 8, and also to Fig. 7 which shows a typical binary scaler channel. Since all scaler channels are alike, a description of one of these channels will be sufficient. The channel shown in Fig. 7 is that associated with 2-binary scaler 412. As shown in Fig. 7, diode gate 412b comprises two diodes 440 and 442 having a common connection to the input grid of monostable multivibrator 412a and poled to normally pass positive and negative pulses, respectively. As shown, the plate of diode 442 is grounded and the transfer pulse from cathode follower 311 is applied to the cathode of diode 440. By such an arrangement monostable multivibrator 412a can only be triggered when there is an output pulse from 2-binary scaler 412 and, simultaneously, the transfer pulse is applied to the cathode of diode 440. This, of course, occurs at time $t_{31}$ (Fig. 3). Also at time $t_{31}$, the reference pulse is derived from cathode follower 314 in time coincidence with the transfer pulse from cathode follower 311 so that at instant $t_{31}$ a reference pulse is also applied as a trigger to the input grid of coding monostable multivibrator 432. When triggered by the positive peaked reference pulse, coding monostable multivibrator 432 provides a positive output pulse from plate 446 and is fully recovered to accept another trigger pulse at the end of one millisecond. This output pulse is labeled $P_0$ in Fig. 8. When triggered, monostable multivibrator 412a provides from plate 448 a positive output pulse which is differentiated by an appropriate RC circuit and applied to the input grid of pulse amplifier 430. The resistor of the RC circuit is common to the output of all the monostable multivibrators and the input grid of pulse amplifier 430. The input grid of coding pulse amplifier 430 is connected to ground through diode 450 which is poled to pass positive pulses only. Thus, coding pulse amplifier 430 is responsive only to differentiated negative peaked pulses to produce a peaked positive output pulse which corresponds to the trailing edge of the output from plate 448. As hereinabove stated, the output pulses from monostable multivibrators 410a–424a increase successively in duration in one millisecond steps with the first monostable multivibrator 410a having a duration of one millisecond. In the example of Fig. 7, the peaked positive output from amplifier 430 corresponding to the trailing edge of the output from plate 448 of monostable multivibrator 412a will be applied as a trigger to monostable coding multivibrator 432 at the end of 2 milliseconds so that coding multivibrator 432 will again be triggered to produce a pulse and recover within one millisecond duration. This pulse is labeled $P_2$ in Fig. 8. In a similar manner, for a count of twenty-two "thetas" coding multivibrator 432 will produce discrete pulses which coincide with the third and fifth milliseconds labeled $P_4$ and $P_{16}$ (Fig. 8), respectively. These pulses are then filtered by coding filter 434 to provide a modulating wave signal which is applied to transmitter 500. While the code is being transmitted, the scanning circuit is operating on its next successive cycle so that there is no dead time beyond 10 milliseconds in receiving the sferics data.

*Decoder unit (600)*

The decoder unit is located at central station D. Its purpose is to convert the transmitted pulse coded signal to the time originally measured at the transmitter which, of course, is the time period proportional to the bearing angle. The decoded signal then provides a bearing line in an electronic plotter (not shown) which may compute the point of intersection of this bearing line with others received from the stations of the network.

Figure 9:
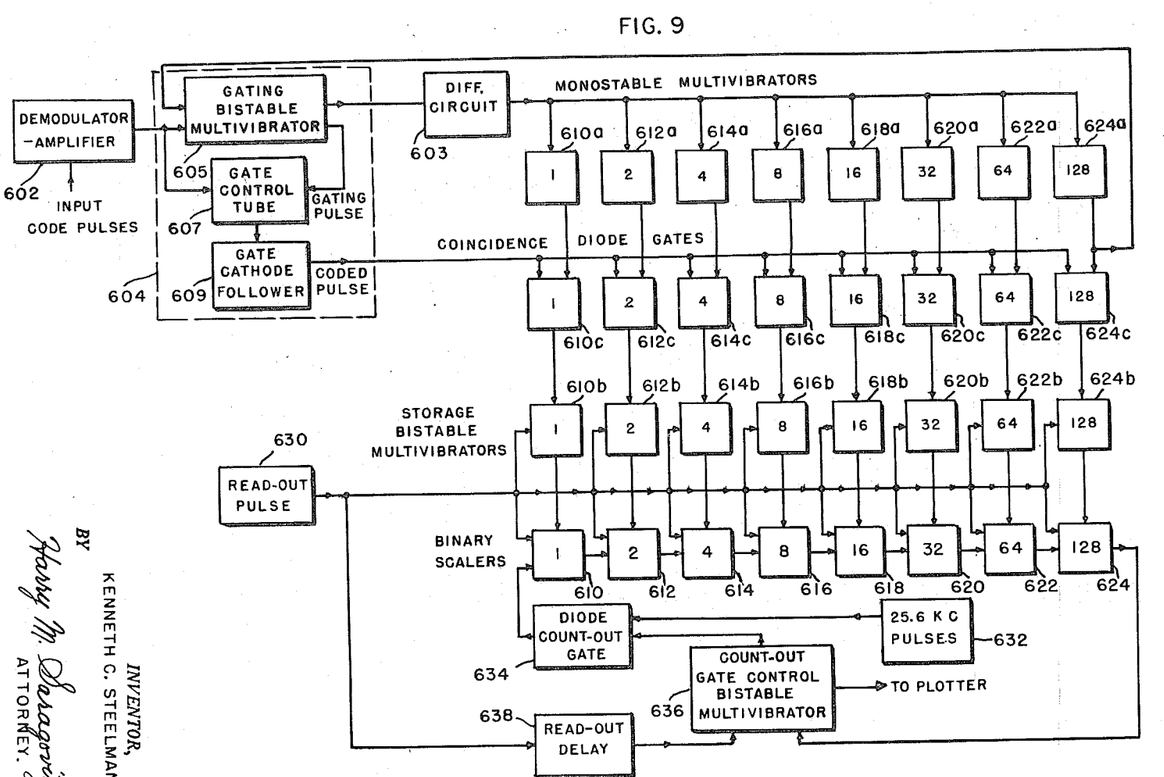
Figure 9 is a block diagram of the decoder unit employed at the receiver.
Figure 10:
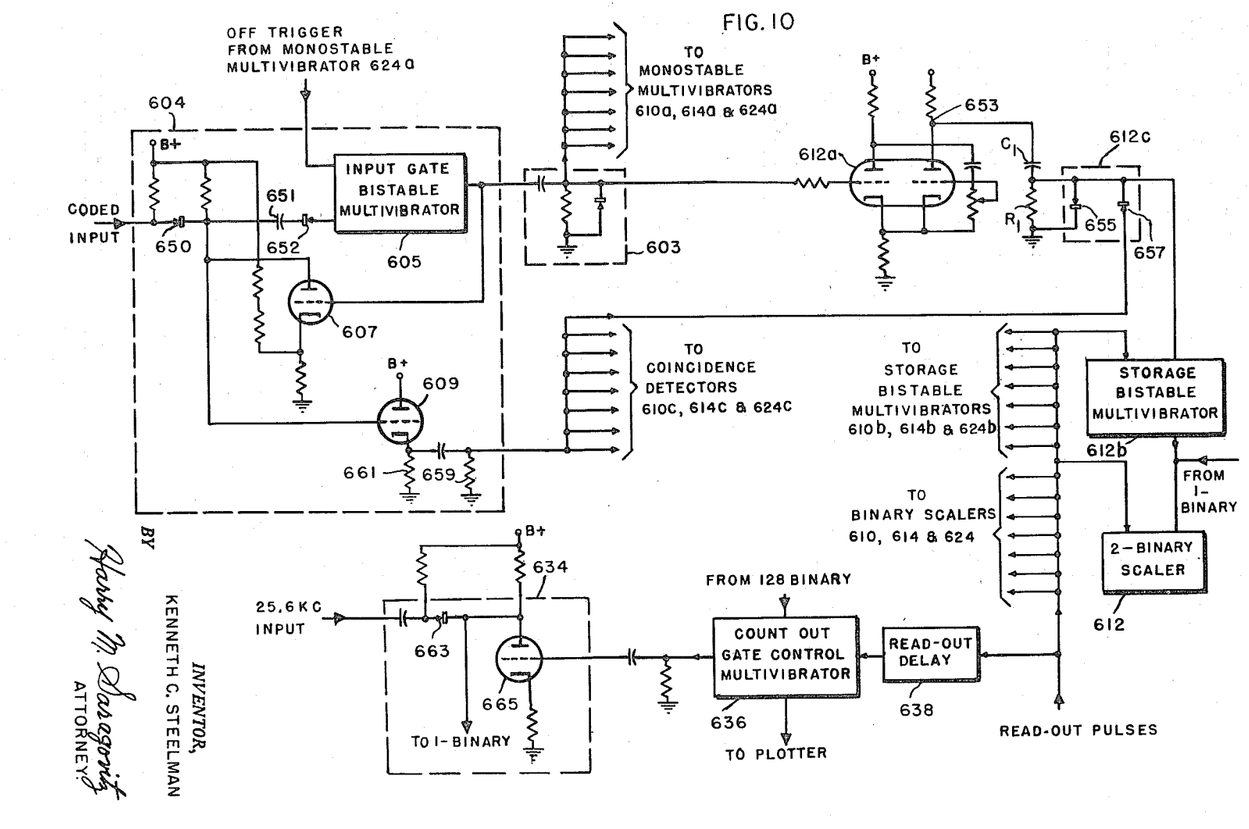
Figure 10 is a schematic representation of the decoder unit.
Figure 11:
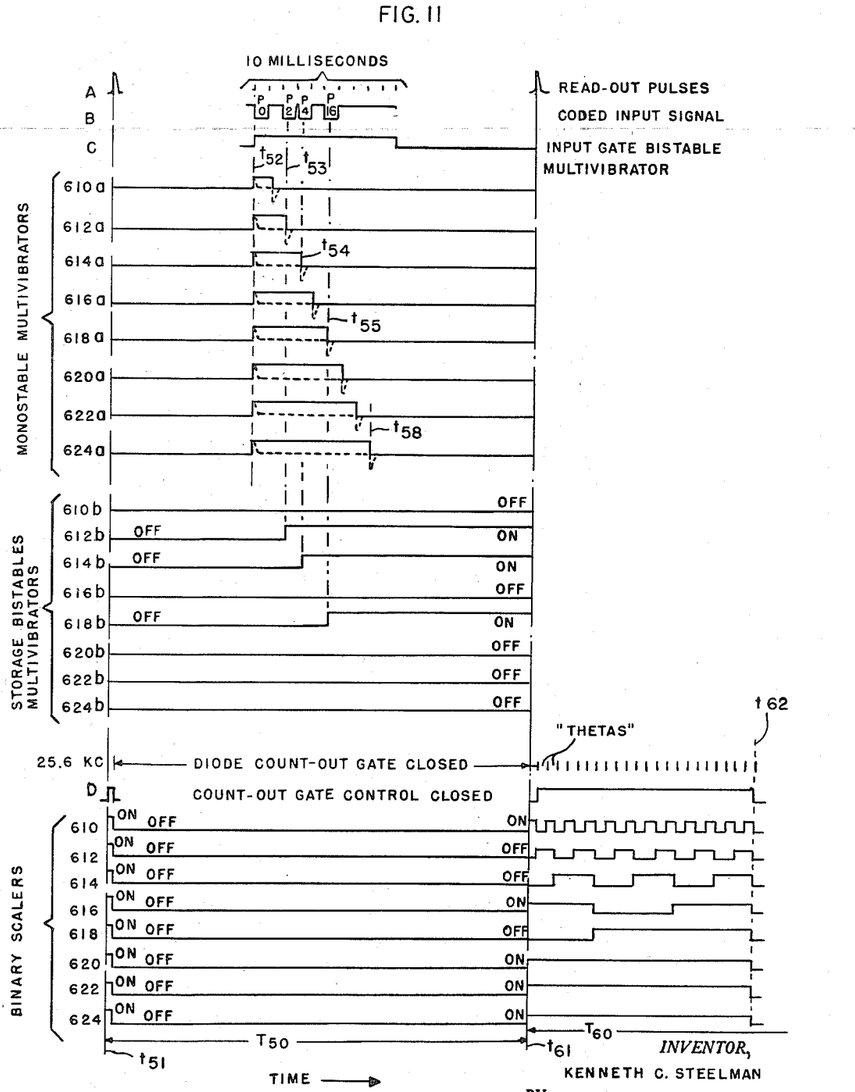
Figure 11 shows a group of explanatory curves which illustrate the operation of the decoder unit.

Referring now to Figs. 9–11, the transmitted coded signal is shown applied to a demodulator and amplifier circuit 602, the output of which provides the binary pulses derived from coder unit 400 in the transmitter. In the example illustrated, the reconstructed binary pulses represent the coded value corresponding to a count of twenty-two "thetas" plus the reference pulse. This series of reconstructed pulses is shown in curve B of Fig. 11, with $P_0$ representing the reference pulse and $P_2$, $P_4$, and $P_{16}$ representing the coded binary pulses corresponding to the count of twenty-two "thetas." Each of the pulses, of course, are of one millisecond duration. The coded binary output from demodulator-amplifier 602 is applied to an input gating circuit 604 which includes a gating bistable multivibrator 605, a gate control tube 607 and a gate cathode follower 609. Bistable multivibrator 605 is adapted to be triggered by the leading edge of the reference pulse $P_0$ to provide a positive gating pulse which allows gate control tube 607 to pass the reconstructed coded binary pulses through the gate cathode follower 609. The output of gate cathode follower 609 is applied simultaneously and respectively as one input to eight coincidence diode gates 610c–624c. The positive gating pulse output from bistable multivibrator 605 is simultaneously applied as respective trigger pulses to eight monostable multivibrators 610a–624a through differentiating circuit 603. The circuit parameters of monostable multivibrators 610a–624a are so chosen that, when triggered, respective positive pulses are generated which successively increase in pulse duration by one millisecond with respect to the output from monostable multivibrator 610a which is initially adjusted to provide a pulse output of 1.5 millisecond duration. Thus, when triggered, monostable multivibrator 612a will provide a positive pulse having a duration of 2.5 milliseconds and the monostable multivibrators 614a–624a will provide positive pulses having respective durations of 3.5 milliseconds, 4.5 milliseconds, 5.5 milliseconds, 6.5 milliseconds, 7.5 milliseconds and 8.5 milliseconds. By such an arrangement, the trailing edge of the respective outputs from monostable multivibrators 610a–624a are made to coincide in time with one of the series of reconstructed binary code pulses which follow the reference pulses $P_0$ and are of one millisecond duration. The respective outputs of monostable multivibrators 610a–624a are each differentiated and applied as respective second inputs to each of the coincidence diode gates 610c–624c. These coincidence gates are arranged to pass a differentiated negative pulse only when the trailing edge of one of the respective outputs from the monostable multivibrators 610a–624a applied to an associated coincidence diode gate is in time coincidence with one of the binary coded pulses applied to the coincidence gate through gating circuit 604 as hereinabove described. The negative differentiated output of the eighth multivibrator 624a, that is at the end of 8.5 milliseconds, is also applied as a trigger pulse to gating bistable multivibrator 605 to flip the output thereof so that the positive gating pulse is removed from gate control tube 607 and no further coded pulses can pass through to the coincidence diode gate until such time that gating bistable multivibrator 605 is again triggered as hereinbelow described.

As shown, the respective outputs of coincidence diode gates 610c–624c are applied to respective associated storage bistable multivibrators 610b–624b. These storage bistable multivibrators are initially "off" and will be triggered to the "on" position only when a pulse is passed by an associated coincidence diode gate as hereinabove described. Thus, the successive storage bistable multivibrators from 610b–624b can only be triggered "on" in a time sequence determined by the coincidence of the trailing edge of one of the outputs from monostable multivibrators 610a–624a and one of the series of binary coded pulses passed through input control gate 604. The triggered storage bistable multivibrator will remain in the "on" position until triggered again by a readout pulse derived from the plotter (not shown) as hereinbelow explained. The read-out pulses are cyclically generated at a prescribed rate by means of a conventional source such as a blocking oscillator and is designated by block 630. The read-out pulse rate is determined by the operating parameters of the electronic plotter and is assumed to be 32 pulses per second. These cyclic pulses are applied simultaneously as trigger pulses to each of the storage bistable multivibrators 610b–624b so that the storage bistable multivibrators are all flipped to the "off" position at the same time. The read-out pulses are also simultaneously applied to a scale-of-128 binary counter comprising eight series connected binary scalers 610–624 which are arranged so that they are each placed in the "on" position by the read-out pulse. Such scalers are well known in the art and may comprise the GE-type binary scaler 4SN1A3. Thus, initially at the beginning of each read-out cycle, each of binary scalers 610–624 are "on." As shown, the respective outputs of storage bistable multivibrators 610b–624b are applied as respective inputs to 1-binary scaler 610; 2-binary scaler 612; 4-binary scaler 614; 8-binary scaler 616; 16-binary scaler 618; 32-binary scaler 620; 64-binary scaler 622; and 128-binary scaler 624. The binary scalers are arranged so that if its associated storage bistable multivibrator is "on" at the time a read-out pulse is applied, then the application of the stored pulse will cause the associated binary scaler to be switched to the "off" position. Also applied to the input of the 1-binary scaler 610 are 25.6 kc. pulses which may be generated by any suitable source represented by block 632. The 25.6 kc. pulses are applied to 1-binary scaler 610 through a diode count-out gate 634 which, in turn, is controlled by the output pulse from a count-out gate control bistable multivibrator 636. The count-out gate control bistable multivibrator 636 is cyclically triggered to its "on" position by the read-out pulse through a delay circuit 638 which provides a delay of approximately 37 microseconds. With count-out gate bistable multivibrator 636 in its "on" position, there is provided a positive pulse from the output thereof which is applied as the gating pulse to diode count-out gate 634 so as to permit the 25.6 kc. pulses to pass through diode count-out gate 634 to the 1-binary scaler 610. When the scale-of-128 counter has counted "through," that is when all the binary scalers 610–624 are in the "off" position, the output of the 128-binary scaler 624 is applied as a trigger to flip count-out gate control bistable multivibrator 636 to the "off" position so that no further 25.6 kc. pulses can be applied to the counter through diode count-out gate 634. The duration of the gating pulse derived from output gate control bistable multivibrator 636 then corresponds to the "theta" count proportional to the transmitted bearing angle.

In explaining the operation of the decoder, reference is made to the curves of Fig. 11 and the schematic diagram shown in Fig. 10 wherein like numerals refer to like elements.

In Fig. 11, the periods $T_{50}$ and $T_{60}$ represent two successive pulse read-out cycles, the period $T_{50}$ hereinafter being referred to as the storage period and the period $T_{60}$ being hereinafter referred to as the plotting period. The cyclic read-out pulses from generator 630 are shown at instants $t_{51}$ and $t_{61}$. The monostable multivibrators 610a–624a are in their quiescent or "off" position at time $t_{51}$ and will remain in this position until a trigger is provided by input gate bistable multivibrator 605. As stated above, the rate of occurrence of the read-out pulses is dependent upon the type of plotter used and is assumed to be 32 pulses per second. The read-out pulse at time $t_{51}$ presets each of the storage bistable multivibrators 610b–624b to their respective "off" positions and presets each of the binary scalers 610–624 to their respective "on" positions. Also, at time $t_{51}$, the input gate bistable multivibrator 605 provides at its output the lower of two positive voltage levels. Although the delayed readout pulse applied to count-out gate control bistable multivibrator 636 will cause a positive voltage gate to be generated at time $t_{51}$, this gate will be of very short duration inasmuch as the first of the 25.6 kc. negative pulses applied to the 1-binary scaler 610 through diode count-out gate 634 will cause all the binary scalers to count-out almost instantaneously. Thus none of the 25.6 kc. pulses can pass through to the 1-binary scaler until the following plotting cycle period $T_{60}$. With the conditions as described above the decoder unit is in its "ready" or storage state at time $t_{51}$.

Let it be assumed that the transmitted binary code series is detected at the decoder during the time corresponding to the 10 millisecond period beginning at time $t_{52}$. The coded pulse output from the demodulator-amplifier 602 shown in curve 9B is applied to input gating circuit 604. As shown in Fig. 10, the coded pulse series is applied to input gate bistable multivibrator 605 through oppositely poled diodes 650 and 652 and coupling capacitor 651 which is connected between the respective diode cathodes. At time $t_{52}$, the leading edge of the reference pulse $P_0$ will provide the trigger to flip the output of gate bistable multivibrator 605 from its lower positive voltage level to its higher or more positive voltage level as shown in curve 9C. This higher positive voltage level is applied to the grid of gate control tube 607 whose plate is connected to the cathode of diode 650. So long as the positive voltage level output from input gate bistable multivibrator 605 is applied to the grid of control tube 607, the coding pulses will pass through diode 650 to the grid of gate cathode follower 609. At time $t_{52}$, the output derived from gate bistable multivibrator 605 is also applied to the respective inputs of monostable multivibrators 610a–624a through the RC differentiating circuit 603 so that at time $t_{52}$ all the monostable multivibrators which are identified in Fig. 11 by their respective reference numerals are simultaneously triggered to the "on" position to provide positive going pulses. As hereinabove explained, the output of monostable multivibrator 610a is adjusted to provide a pulse having a duration of 1.5 milliseconds and the duration of the output pulses derived from monostable multivibrators 612a–624a are adjusted to successively increase in duration by one millisecond with respect to that derived from 610a. Thus for the coded pulse shown in curve 9B, the trailing edge of the pulse derived from monostable multivibrators 612a, 614a, and 618a are coincident with coded pulses $P_2$, $P_4$, and $P_{16}$, respectively, at times $t_{53}$, $t_{54}$, and $t_{55}$. The differentiated outputs of the monostable multivibrators 610a–624a are shown in dotted lines and a typical monostable multivibrator 612a and its associated output differentiating circuit $R_1C_1$ is illustrated in Fig. 10. Referring again to Fig. 10, the differentiated output from plate 653 is applied to coincident gate 612c which includes two oppositely poled diodes 655 and 657. Diode 655 is connected across resistor $R_1$ and is poled to pass positive pulses to ground. Diode 657 has its anode connected to ground through resistor 659 which is capacitively coupled to cathode resistor 661 of cathode follower 609. By this arrangement, at time $t_{52}$ the positive differentiated pulse derived from the output of monostable multivibrator 612a is by-passed to ground through diode 655. The negative differentiated pulse will pass through diode 657 to ground through resistor 659 unless there is a time coincident pulse derived from the cathode of gate cathode follower 609. Since the monostable multivibrators 610a–624a are identical, it can be seen that for the assumed coded pulse of curve 9B, only the negative differentiated pulses corresponding to the trailing edges of the output pulses derived from multivibrators 612a, 614a, and 618a, will be applied to respective storage bistable multivibrators 612c, 614c and 618c as trigger pulses to place them in the "on" position. The differentiated output of the eighth monostable multivibrator 624a is also applied to gating bistable multivibrator 605 at time $t_{58}$ so that the gating pulse is removed from the grid of control tube 607 at this instant. As shown in Fig. 11, where the outputs of the storage bistable multivibrators are identified by their corresponding reference numerals, storage bistable multivibrators 612c, 614c and 618c will be triggered "on" at respective times $t_{53}$, $t_{54}$ and $t_{55}$ while the remaining storage bistable multivibrators will remain in their "off" positions. Thus, at the end of the storage period, only the storage bistable multivibrators 612c, 614c and 618c are "on" while the remaining storage bistable multivibrators are "off."

At the start of the next read-out cycle, the read-out pulse at time $t_{61}$ will reset the storage bistable multivibrators 610c–624c so that a triggering pulse will be derived from storage bistable multivibrators 612c, 614c and 618c which of course were "on" at this instant. The triggering output pulses from these storage bistable multivibrators will be applied to the respective 2-binary, 4-binary and 16-binary scalers, 612, 614 and 618 so that these scalers will be placed in the "off" position while the remaining binary scalers will be placed in their respective "on" positions at time $t_{61}$ by the read-out pulse as hereinabove explained. Also, the read-out pulse at time $t_{61}$ is applied to count-out gate bistable multivibrator 636 so that it will be flipped to provide its high or more positive output voltage level as a gating voltage to diode count-out gate 634. This will permit diode count-out gate 634 to pass the negative 25.6 kc. pulses to 1-binary scaler 610. As shown in Fig. 10, the diode gate 634 includes a diode 663 and a control tube 665. The plate of control tube 665 is connected to the cathode of diode 663 so that with a gating pulse applied to the control grid of control tube 665, diode 663, which is normally nonconductive, now becomes conductive to pass the 25.6 kc. pulses to the 1-binary scaler 610. Thus, at time $t_{61}$, the binary scalers begin to count and will count through. Since the 2-binary, 4-binary and 16-binary scalers were placed in the "off" position by the output from the associated storage bistable multivibrators 612a, 614a, and 618a, respectively, the scalers 610–624 will not count-out until twenty-three 25.6 kc. pulses, i. e., twenty-two "thetas" in time, have passed through at which time the 128-binary scaler 624 will provide a pulse which flops count-out gate control bistable multivibrator to its lower or negative level voltage output so that the gate is removed from the control grid of control tube 665 and consequently no further 25.6 kc. signals can be applied to the 1-binary scaler. This occurs at time $t_{62}$ so that the duration of the output gating pulse from multivibrator 636 is the time period which is proportional to the bearing angle.

While there has been described what is at present considered to be the preferred embodiment of this invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. An instantaneous telemetering system for use with a direction finder apparatus adapted to provide two in-phase damped sine-wave signals of a prescribed frequency and a trigger signal coincident with the initial half-cycle of said sine-wave signals when a signal having a given azimuth is detected by said apparatus, said system comprising: a storage tube including a mosaic type target at one end thereof, a cathode-ray beam producing means at the other end thereof, and cathode-ray beam deflecting means; means in circuit with said beam deflecting means whereby said beam is cyclically scanned in a circular path on said mosaic target at a prescribed rate, zero circular scan time being coincident with a reference azimuth position; means for generating a prescribed number of time increment signals for each circular scan cycle; means in circuit with said beam deflecting means and responsive to the relative amplitudes of the in-phase signal outputs from the direction finder apparatus whereby said cathode-ray beam is caused to trace a linear path from the center of said target when a signal is detected by the direction finder apparatus, the angle formed by said linear trace and a line extending from the center of said mosaic target to zero circular scan time being a measure of the azimuth angle of the detected signal; means responsive to said trigger signal for simultaneously switching off said circular scan means and switching on said linear trace producing means upon the detection of the given azimuth signal whereby said circular scan is interrupted and said linear trace appears on said mosaic target only for a short duration relative to the circular scan cycle, and said circular scan is again applied after said duration; means responsive to the signal derived from said mosaic target at the instant the circular scan intercepts the point where said linear trace had appeared on said target whereby the azimuth angle is converted to a period of time which includes a number of said time increment signals proportional to the given azimuth angle; means responsive to said time increment signals for converting said period of the time to a binary pulse code the output of which corresponds to the count of the time increment signals in said period of time; means for transmitting a signal modulated by said binary pulse code; a receiver for demodulating the transmitted signal whereby said binary code is reproduced; and means at said receiver responsive to the reproduced binary code for converting said binary code to said period of time.

2. In combination: a direction finder apparatus for providing two in-phase damped sine-wave signals of a prescribed frequency and a trigger signal coincident with the initial half-cycle of said sine-wave signals when a signal having a given azimuth is detected by said apparatus; a storage tube including a mosaic type target at one end thereof, a cathode-ray beam producing means at the other end thereof, and cathode-ray beam deflecting means; means in circuit with the beam deflecting means whereby said beam is cyclically scanned on said mosaic target in a circular path at a prescribed rate, zero circular time scan being coincident with a reference azimuth position; means for generating a prescribed number of time increment signals for each circular scan cycle; means in circuit with said beam deflecting means and responsive to relative amplitudes of the in-phase signal outputs from said direction finder apparatus whereby said cathode-ray beam is caused to trace a linear path from the center of said target when a signal is detected, the angle formed by said linear trace and a line extending from the center of said mosaic target to zero circular scan time being a measure of the azimuth of the detected signal; means responsive to said trigger signal for simultaneously switching off said circular scan means and switching on said linear trace producing means upon the detection of the given azimuth signal whereby said circular scan is interrupted and said linear trace appears on said mosaic target only for a short duration relative to the circular scan cycle, and said circular scan is again applied after said short duration; and means responsive to the signal derived from said mosaic target at the instant the circular scan intercepts the point where said linear trace had appeared on said target whereby the azimuth angle is converted to a period of time which includes a number of said time increment signals proportional to the given azimuth angle.

3. In combination: a direction finder apparatus for providing two in-phase damped sine-wave signals at a prescribed frequency and a trigger signal coincident with the initial half-cycle of the sine-wave signal when a signal having a given azimuth is detected by said apparatus; a storage tube including a mosaic type target at one end thereof, a cathode-ray beam producing means at the other end thereof, and cathode-ray beam deflecting means; a timing generator including means for generating pulses cyclically at a prescribed rate, means responsive to said pulses for generating a sine-wave signal frequency at said prescribed rate, and means for generating a prescribed number of time increment signals between each of said cyclically generated pulses; means responsive to said generated sine-wave frequency signal and in circuit with said deflecting means whereby said beam is scanned cyclically in a circular path at said prescribed rate, zero circular scan time being coincident with a reference azimuth position; means in circuit with said beam deflecting means and responsive to the relative amplitudes of the in-phase signal outputs from said direction finder apparatus whereby said cathode-ray beam is caused to trace a linear path from the center of said target when a signal is detected, the angle formed by said linear trace and a line extending from the center of said mosaic target to zero circular scan time being a measure of the azimuth of the detected signal; means responsive to said trigger signal for simultaneously switching off said circular scan means and switching on said linear trace producing means upon the detection of the given azimuth signal whereby said circular scan is interrupted and said linear trace appears on said mosaic target only for a short duration relative to the circular scan cycle, and said circular scan is again applied after said short duration; and means responsive to said cyclically generated pulses and the signal derived from said mosaic target at the instant the circular scan intercepts the point where said linear trace had appeared on said target whereby the azimuth angle is converted to a period of time which includes a number of said time increment signals proportional to the measured azimuth angle.

4. The combination in accordance with claim 3 wherein said last mentioned means comprises a mixer-amplifier having two input grids and two output plate circuits capacitively coupled to a common load resistor; means for coupling said cyclically generated pulses to one of said grids and the signal derived from said mosaic target to the other of said grids, a bistable multivibrator having its input coupled to said load resistor whereby a relative positive voltage level is derived from the output of the bistable multivibrator for the duration between the application of one of said cyclically generated pulses and the signal derived from said mosaic target and a relative negative voltage level is derived from the output of the bistable multivibrator for the duration between the application of the signal derived from said mosaic target and the next successive cyclically generated pulse; and a diode gate in circuit with the output of said time increment signal generator and the output of said bistable multivibrator, said diode gate being rendered conductive to pass said time increment signals only for the duration of the relative positive output from said bistable multivibrator.

5. A system for transmitting sferics data derived from a direction finding apparatus adapted to provide two in-phase damped sine-wave signals and a trigger signal coincident with the initial half-cycle of said sine-wave signals when a sferics signal is detected at a given azimuth, said system comprising: a storage tube including a mosaic target at one end thereof, a cathode-ray beam producing means at the other end thereof, and cathode-ray beam deflecting means; a timing generator including means for generating pulses cyclically at a prescribed rate, means responsive to said pulses for generating a sine-wave signal at a frequency equal to said prescribed rate, and means for generating a prescribed number of time increment signals between each of said cyclically generated pulses; means responsive to said generated sine-wave signal and in circuit with said deflecting means whereby said beam is scanned cyclically in a circular path at said prescribed rate, zero circular scan time being coincident with a reference azimuth position; means in circuit with said beam deflecting means and responsive to the relative amplitudes of the in-phase signal outputs from said direction-finder apparatus whereby said cathode-ray beam is caused to trace a linear path from the center of said target when a signal is detected, the angle formed by said linear trace and a line extending from the center of said mosaic target to zero circular scan time being a measure of the azimuth of the detected signal; switch means responsive to said trigger signal for simultaneously switching off said circular scan means and switching on said linear trace producing means upon the detection of the given azimuth signal whereby said circular scan is interrupted and said linear trace appears on said mosaic target for a short duration relative to the circular scan cycle, and said circular scan is again applied after said duration; means responsive to said cyclically generated pulses and a signal output derived from said mosaic target whereby the azimuth angle is converted to a period of time which includes a number of said time increment signals proportional to the measured azimuth angle; means responsive to said trigger pulse for gating the output signal derived from said mosaic target whereby only the output signal from said target at the instant said circular scan intersects the point where said linear trace appeared on said target is applied to the time converting means; means responsive to said cyclically generated pulses and to the time increment signals in said period of time for converting said period of time to a binary code the output of which corresponds to the count of the time increment signals in said period of time; and means for transmitting a signal modulated by said binary code.

6. The combination in accordance with claim 5 wherein said binary pulse code producing means comprises: a prescribed number of cascaded binary counters adapted to count through the total number of said time increment signals corresponding to each circular scan cycle; means for initially setting each of said counters to their respective off positions at the start of each scan cycle; gating means in circuit with said time increment signals and the input to the first of said binary counters, said gating means being responsive to said cyclically generated pulses and the output signal derived from said mosaic target whereby it is rendered conductive to pass said time increment signals when triggered by said cyclically generated pulses and rendered non-conductive by the application of said output signal, only those counters being placed on which correspond to the sum of the time increment signals in said period of time, the remaining counters being in the off position; discrete diode gates in circuit with each of said counters, said diode gates being rendered conductive only when one of said cyclic generated pulses coincides with the output of an associated counter at the instant said counters are reset; and discrete monostable multivibrators in circuit with each of said diode gates and adapted to produce a negative trigger pulse when the associated diode gate is rendered conductive, the output of successive negative trigger pulse being spaced at equal intervals in time such that the total of said time intervals are equal to the time of a scan cycle; and means responsive to said negative pulses whereby for each negative pulse there is derived a pulse of prescribed duration, said prescribed duration pulses being spaced in time in accordance with the time the respective negative pulses are applied from said discrete monostable multivibrators.

7. An instantaneous telemetering system for use with a direction finder apparatus adapted to provide two in-phase damped sine-wave signals of a prescribed frequency and a trigger signal coincident with the initial half-cycle of said sine-wave signals when a signal having a given azimuth is detected by said apparatus, said system comprising: a storage tube including a mosaic target at one end thereof, a cathode-ray beam at the other end thereof, and cathode-ray beam deflecting means; means in circuit with said beam deflecting means whereby said beam is cyclically scanned in a circular path on said mosaic target at a prescribed rate, zero circular scan time being coincident with a reference azimuth position; means in circuit with said beam deflecting means and responsive to the relative amplitudes of the in-phase signal outputs from the direction finder apparatus whereby said cathode-ray beam is caused to trace a linear path from the center of said target when a signal is detected by the direction finder apparatus, the angle formed by said linear trace and a line extending from the center of said mosaic target to zero circular scan time being a measure of the azimuth angle of the detected signal; means responsive to said trigger signal for simultaneously switching off said circular scan means and switching on said linear trace producing means upon the detection of the given azimuth signal whereby said circular scan is interrupted and said linear trace appears on said mosaic target only for a short duration relative to the circular scan cycle, and said circular scan is again applied after said short duration; means responsive to said trigger signal for deriving an output pulse from said mosaic target at the instant the circular scan intercepts the point where said linear trace had appeared in said target; means for generating a prescribed number of time increment signals for each circular scan cycle; gating means in circuit with said time increment signals and responsive to said circular scanning means and the mosaic target output pulse whereby said gating means is rendered conductive at the beginning of each circular scan to pass said time increment signals and rendered non-conductive upon the application of said mosaic target output pulse, the total number of time increment signals passed during the conductive period being a time duration proportional to the azimuth angle of the detected signal; means responsive to the time increment signal output of said gating means for converting said time duration to a binary pulse code having its digits spaced in time relationship such that the code corresponding to the prescribed number of time increment signals is completed within one scan cycle; means for transmitting a signal modulated by said binary code; a receiver for demodulating the transmitted signal whereby said binary code is reproduced; and means at the receiver responsive to the reproduced binary code for converting said binary code to the time duration proportional to the azimuth angle of the detected signal.

8. The system in accordance with claim 7 wherein said last mentioned means comprises; a second source of said time increment signals; means for cyclically generating pulses at a predetermined rate; a plurality of binary scalers having their respective inputs responsive to said cyclically generated pulses such that each of said scalers are placed in the on position by said cyclically generated pulses, the outputs of said binary scalers being connected in cascade to provide a count through of the number of time increment signals from said second source for a period corresponding to said circular scan cycle; means for applying the time increment signals from said second source to the input of the first of said binary scalers; discrete means responsive to the reproduced binary code pulses for producing successive discrete pulses in a time sequence such that there is one discrete pulse generated within the time period of each of the spaced digits in the binary code; discrete means responsive to the reproduced binary code pulses and in circuit with each of said discrete pulse producing means whereby respective trigger pulses are produced for each pulse of the reproduced binary code which is in time coincidence with one of said discrete pulses; discrete means in circuit with the input of each of said binary scalers and responsive to respective trigger pulse outputs for producing respective constant voltage level signals, the initiation of each of said constant voltage level signals being coincident in time with its respective trigger pulse; means for applying said cyclically generated pulses to each of the constant voltage level signal producing means for deriving respective pulse signals therefrom and simultaneously applying each of the pulse signals to its associated binary scaler whereby the associated binary scaler is placed in the off position; and means in circuit with said cyclically generated pulses and the output of the last of said binary scalers for controlling the duration the time increment signals from said second source are applied to the first of said binary scalers.

9. In a system wherein a prescribed time duration equal to the sum of a given number of time increment signals is received in binary pulse code form which includes a reference pulse indicating the start of said time duration, the digits in said code being spaced in time relationship such that the total number of binary pulses exclusive of said reference pulse occur in a given period corresponding to a prescribed number of time increment signals, means for converting said binary pulse code to the prescribed time duration comprising in combination; means for generating said time increment signals; means for cyclically generating pulses at a prescribed rate; a plurality of binary scalers having their outputs connected in cascade and adapted to provide a complete count of the prescribed number of time increment signals for the given period, each of said scalers being placed in the on position by said cyclically generated pulses; means for applying said time increment signals to the first of said binary scalers; discrete means responsive to said reference pulse for producing successive discrete pulses in a time sequence such that there is one discrete pulse generated within the time period of each of said digits; discrete means in circuit with the output of each of said discrete pulses producing means and responsive only to the binary code pulses following said reference pulse whereby respective trigger pulses are produced for each pulse of the binary code which is in time coincidence with one of said discrete pulses; discrete means in circuit with the input of each of said binary scalers and responsive to the respective trigger pulse outputs for producing respective constant voltage level signals, the initiation of the respective constant voltage level signals being coincident in time with its associated trigger pulse; means for applying said cyclically generated pulses to each of the constant voltage level signal producing means for deriving respective pulse signals therefrom and simultaneously applying said respective pulse signals to the associated binary scaler whereby the associated binary scaler is placed in the off position; and means in circuit with said cyclically generated pulses and the output of the last of said binary scalers for controlling the duration said time increment signals are applied to the first of said binary scalers.

10. The system in accordance with claim 8 wherein the successive discrete pulse producing means comprises: a bistable multivibrator adapted to be triggered on by said reference pulse; a plurality of monostable multivibrators equal in number to the total number of said binary code pulses, exclusive of the reference pulse, in the given period; means for simultaneously triggering each of said monostable multivibrators by the output of said bistable multivibrator at the instant the bistable multivibrator is triggered on, said monostable multivibrators being adapted to provide respective outputs of successively increasing duration, the difference in duration between successive pulses being equal to the time the digits in the binary code are spaced; and means responsive to the maximum duration output of the monostable multivibrators for triggering off the bistable multivibrator at the end of said maximum duration.

No references cited.